United States Patent Office 3,074,845
Patented Jan. 22, 1963

3,074,845
PARTICULATE PESTICIDAL COMPOSITION COATED WITH AN AMIDO-ALDEHYDE RESIN POLYMERIZED IN SITU
Robert J. Geary, Vero Beach, Fla., assignor to Plant Products Corporation, Vero Beach, Fla., a corporation of Florida
No Drawing. Filed Oct. 14, 1959, Ser. No. 846,237
7 Claims. (Cl. 167—42)

This invention relates to new biologically active compositions, and in particular, to parasiticidal compositions of the pesticidal, bactericidal, and fungicidal type which are not only outstandingly safe to use but, in addition, exhibit a continuous and sustained action over a much longer period of time than heretofore obtainable with similar agents under the same conditions of use.

It is, of course, well recognized that among the various compounds and compositions which are employed as insecticides, herbicides, fungicides, nematocides, and bactericides, a great number, if not the preponderance thereof, are substances poisonous to other forms of life than the specifically intended application. Aside from danger to the user, that is, man, other mammals, birds, fishes, and desirable plant life may be subjected or exposed to undesirable or even lethal concentrations of the aforementioned types of agents, and thereby be severely injured, permanently damaged or totally destroyed. In the insecticide field such highly toxic substances as the organic phosphates, the carbamates, and the chlorinated hydrocarbons are used in tremendous quantities not only on an industrial or professional scale but also by literally millions of "Do It Yourself" amateurs in the home garden and the like, and in both of these categories there is the constant danger of toxic reactions in all forms of life other than the particular form it is desired to control or destroy. In addition to the dangers inherent in the handling of these economic poisons, there is also a considerable hazard due to the lingering action of the pesticides.

It is, therefore, an object of this invention to provide biologically active compositions which are outstandingly safe to handle.

It is another object of this invention to provide methods for the preparation of biologically active compositions which are outstandingly safe to handle.

It is still another object of this invention to provide biologically active compositions which give a sustained activity over an extended and/or predetermined period of time, and methods for the preparation thereof.

It is a still further object of this invention to provide biologically active compositions which give a sustained and controlled release of active principle sufficient to neutralize or destroy the selected pest, without detrimentally affecting other forms of life.

It is still another object of this invention to provide processes for the preparation of biologically active compositions which are characterized by a sustained and controlled release of active principle in an amount sufficient to render innocuous and/or destroy the selected pest without affecting, in any deleterious manner, other forms of life.

It is still another object of this invention to provide methods for controlling and/or destroying selected pests.

Another object of this invention is to provide processes whereby selected pests in a given environment may be controlled and/or destroyed, and particularly to provide processes whereby such control and/or destruction may be effected without danger or harm to other forms of life.

Other objects and advantages will appear as the description proceeds.

The ends and objects to which the present invention is directed, are attained by treating the biologically active material with an amido-aldehyde type resin, whereby the active principle in combination with a carrier is encapsulated, impregnated, coated or otherwise rendered partially deactivated.

It is well known that many biologically active reagents, both organic and inorganic, may and can be employed as impregnants for various inert carrier substances. Among such inert materials, mention may be made of clays, peat, expanded or exfoliated mica, expanded or exfoliated perlite, and the like as exemplifying the inorganic carriers, and tobacco stems, ground corn cobs, coconut shells, walnut shells, redwood bark, and the like, as exemplifying the organic carriers. Insecticides, herbicides, fungicides, nematocides, and other pesticidal and pest inhibiting agents are commonly used with the above mentioned carriers, but it will be at once evident that, in general, the function of the carrier is to facilitate application of the agent and it does not affect the toxicity or safety factor. It is also obvious that, in most instances, the concentration of the active ingredient, in order to achieve the desired ends need not be very great, and therefore, in order to obtain effective dispersal and distribution thereof, use in a diluted form is called for. It is equally true that when employed in such diluted forms the bioloically active compounds are safer to handle than in the more concentrated forms, but as pointed out above, the basic toxicity factor of the active ingredient is not changed.

I have discovered that by the aforementioned technique of treating the biological material-carrier combination with the amido-aldehyde resin, there is obtained a combination of active principle, carrier and resin, in addition to any other additives, which has unique properties of safety and concomitant therewith outstanding characteristics for pesticidal control and/or destruction.

The amido-aldehyde resins herein contemplated include the following combinations:

Urea-formaldehyde
Melamine-formaldehyde
Guanidine-formaldehyde
Dicyandiamide-formaldehyde
Biuret-formaldehyde
Cyanamide-formaldehyde
Dicyandiamidine-formaldehyde
Thiourea-formaldehyde
Urea-thiourea-formaldehyde
Urea-melamine-formaldehyde In addition to the amines or amides exemplified above, other substituted forms thereof may be used, as, for example:

Alkyl ureas, e.g., methyl urea, ethyl urea, etc.
Aryl ureas, e.g., phenyl urea, unsym. diphenyl urea, etc.

Alkyl aryl ureas, e.g., unsym. methyl phenyl urea, etc.
Alkyl thioureas
Aryl thioureas
Alkyl aryl thioureas
Alkyl and aryl guanidines, e.g., diphenyl guanidine
Alkyl melamines, e.g., 2,4,6-triethyltriamino-1,3,5-triazine
Aryl melamines, e.g., 2,4,6-triphenyltriamino-1,3,5-triazine It is, of course, understood that mixtures of the aforementioned amino or amido compounds may be used to obtain resins of varying physical and chemical characteristics.

In addition to formaldehyde as the source of the aldehyde moiety, other aldehydes may be used in admixture therewith or in lieu thereof. Such aldehydes include:

Paraformaldehyde
   Acetaldehyde
   Hexamethylenetetramine
   Butyraldehyde
   Crotonaldehyde
   Benzaldehyde
   Furfural, and the like Various modifying agents well known in the resin art may be admixed or reacted with any of the above described condensation products. As modifying agents, there may be employed monohydric alcohols, e.g., ethyl, propyl, isopropyl, butyl, amyl, nonyl, decyl, tridecyl alcohols, etc., polyhydric alcohols, e.g., ethylene glycol, diethylene glycol, glycerine, 1,4-butanediol, pentaerythritol, etc., amides, e.g., formamide, acetamide, stearamide, benzamide, toluene sulphonamides, etc., amines, such as ethylene diamine, aniline, phenylene diamines, natural gums and resins such as shellac, rosin, rosin esters and other rosin derivatives, gelatin, alginates, cellulose ethers and esters, dyes, fillers, pigments, plasticizers, and the like. There may also be added or interacted fatty acids and oils such as oleic, linoleic, etc., as well as other acids of the aliphatic and aromatic series as, for example: succinic acid, malonic acid, suberic acid, sebacic acid, adipic acid, phthalic acid, terephthalic acid, phenols, naphthols, and the like.

It has been discovered that the amido-aldehyde coating on the biologically active ingredient-carrier combination, while substantially insoluble in water and other aqueous media as well as in lipoid materials, and thereby capable of protecting the said active ingredient, nevertheless in the environment of use is degraded by the natural organisms and chemical influences of the environment to permit a sustained and slow but effective release of the biological so that the desired end result of control and/or destruction of the pest is accomplished without untoward reactions on other living matter. The rate of degradation or decomposition of the amido-aldehyde resin coating may be varied in any given environment by modification of the particular chemical nature of the resin, in the manner described above, and further to be exemplified below.

The invention as herein described is applicable to any biologically active material or composition and, in particular, to insecticides, fungicides, herbicides, nematocides, and other biocides, plant growth regulators and the like which are utilized in an environment which will promote the degradation or decomposition of the amido-aldehyde resin component of the compositions of this invention, and specifically and preferably in a soil environment. Particularly advantageous results are obtained with insecticides of the systemically active organic phosphorus compound type. Among the biologicals which are contemplated mention may illustratively be made of the following:

DDT
Chlordane
Dieldrin
TDE (dichlorodiphenyl dichloroethane)
Methoxychlor
Heptachlor
Gamma benzene hexachloride
Isolan (1-isopropyl-3-m-ethyl pyrazolyl-5-dimethyl carbamate)
3-methyl-pyrazolyl dimethylcarbamate
Aldrin (1,2,3,4,10,10-hexachloro-1,4,4a,5,8,8a-hexahydro-1,4-endo-exo-5,8-dimethanonaphthalene)
Endrin (1,2,3,4,10,10-hexachloro-6,7-epoxy-1,4,4a,5,6,7,8,8a-octahydro-1,4-endo-endo-5,8-dimethanonaphthalene)
Isodrin (1,2,3,4,10,10-hexachloro-1,4,4a,5,8,8a-hexahydro-1,4-endo-endo-5,8-dimethanonaphthalene)
Maneb (manganese ethylene bisdithiocarbamate)
Zineb (zinc analog of Maneb)
Naban (disodium analog of Maneb)
Ferbam (ferric dimethyl dithiocarbamate)
Ziran (zinc analog of Ferbam)
Captan (N-trichloromethylmercapto-4-cyclohexane-1,2-dicarboximide)
Karathane (2,4-dinitro-6-capryl phenol crotonate)
Aramite (butyl phenoxyisopropyl chloroethyl sulfite)
Ovotran (p-chlorophenyl-p-chlorobenzenesulphonate)
Sulphenone (p-chlorophenyl sulphone)
Dichlorophenyl benzenesulphonate
Parathion
Dimethyl parathion
Demeton (O,O-diethyl-O-2-ethylmercaptoethyl thiophosphate)
Octamethyl pyrophosphoramide
O,O-diethyl bis(dimethylamido) pyrophosphate, sym., and unsym.
Diethoxythiophosphoryl tetramethyl-diamido phosphate
Alpha-diethoxyphosphinodithioacetylurea
Alpha-dimethoxyphosphinodithioacetylurea
Diethoxyphosphinodithioacetamide
Dimethoxyphosphinodithioacetamide
Bis(dimethylamido) phosphoryl fluoride
Bis(dimethylamido) phosphoryl azide
2-chlorovinyl diethyl phosphate
Sodium selenate
Potassium selenate
Sodium fluoroacetate
2,4-D
2,4,5-T
Chloro IPC
Phenyl mercuric acetate
Nemagon (Shell)
Cadmium chloride
Diuron (Du Pont)
Monuron (Du Pont)
Semizin (Geigy)
Dalapon (Dow)
EPTam (Stauffer), and the like
Aminotriazole
Thimet
Dowco 109 and its oxygen analog
Various biologically active inorganic salts of metals such as copper, silver, chromium, mercury, etc.

The amounts of biological, carrier and resin coating may be varied considerably depending upon the particular agents employed. Thus with the highly toxic biologically active materials more resin coating is preferred. In general, it will be found that for the preponderance of biologicals, there may be employed for each part thereof from 0.5 to 50 parts of resin and from about 0.1 to 20 parts of carrier.

The following examples will serve to illustrate the present invention without being deemed limitative thereof. Unless otherwise indicated, parts and proportions referred to herein are by weight.

*Example 1*

To 1000 g. of expanded mica there is added 10 g. of "Thimet" (an organic phosphorus compound) emulsified in water. After thoroughly drying the impregnated micaceous mass, there is added 2000 g. of a mixture of 40% formaldehyde, urea, and 85% phosphoric acid catalyst in the ratio of 2 parts formaldehyde, 1 part urea and 0.02 part acid catalyst. The mixture is rapidly agitated during the ensuing polymerization reaction. After 30 minutes of stirring, a friable, substantially dry, readily handled product is obtained. Even though the pesticide employed is extremely poisonous, it may now be readily handled without danger. Upon the addition of this prepared composition to the soil, effective pesticidal action is obtained due to the slow release of the active ingredient resulting from the gradual decomposition of the urea-formaldehyde resin by the micro-organisms and chemical substances in the soil.

*Example 2*

200 g. of a highly absorbent bentonite clay is impregnated with 100 g. of "Thimet" in the same form as used in Example 1. The dried, impregnated clay is then treated with 350 g. of a mixture composed of:

2 parts formaldehyde (40%)
0.8 part urea
0.2 part thiourea
0.03 part sulphuric acid (60%)

The mass is treated in the manner of Example 1 to yield a similar product. Nowithstanding the extremely high proportion of pesticide, the final product is safe to handle.

*Example 3*

The procedures of Examples 1 and 2 are repeated employing first kaolin and then peat as the carrier instead of mica. Again, excellent results are in each instance obtained.

*Example 4*

Example 1 is again repeated using, however, in lieu of formaldehyde, a molecularly equivalent amount of acetaldehyde. Similarly effective results are obtained.

*Example 5*

Example 1 is again repeated employing in place of urea, molecularly equivalent amounts of the following amido compounds:

(A) Melamine
(B) Mixture of equal parts of melamine and urea
(C) Dicyandiamide
(D) Mixture of equal parts of urea and guanidine
(E) Mixture of 5 parts urea and 1 part ethyl urea

*Example 6*

100 g. of kaolin is thoroughly mixed with 5 g. of Captan fungicide. This mixture is then worked into a doughy mass with a sufficient amount of a mixture of aqueous 40% formaldehyde and urea, the latter two ingredients in the ratio of 2:1. The dough is extruded in the form of a rod ¼ inch in diameter. As the composition comes from the extruder it is sprayed with a catalytic amount of 50% aqueous sulphuric acid to effect resinification.

*Example 7*

100 g. of kaolin is thoroughly mixed with 100 g. of Captan, and then wet down with the same urea-formaldehyde mixture used in Example 6, to the extent that the resultant composition "balls up" upon treatment on a vibration screen. After "balling" the product is treated with an acid catalyst as in Example 6, and finally permitted to cure at room temperature. Outstanding prolonged fungicidal effects are obtained in soil as well as in the rumen of cattle. The resin content of this formulation is 100 g. and contrasts with twice this content in Example 6.

*Example 8*

50 g. of the highly active weed killer "Diuron" is pelletized with 500 g. of fertilizer material comprising superphosphate and potassium chloride, and 150 g. of a mixture of formaldehyde and urea in a ratio of 2:1 (100% active basis). The resulting granules are treated with a spray of sulphuric acid catalyst. The resinification reaction which occurs is exothermic, and after the mass has cooled to about room temperature, it is further permitted to "cure" until the resin formation is complete.

*Example 9*

As an alternative to the method described in Example 8, the herbicide may be incorporated with the fertilizer during the in situ formation thereof, that is, by the ammoniation of the phosphate material. This latter procedure is highly exothermic and the evolved heat may be used to advantage to promote the polymerization reaction of the subsequently applied urea-formaldehyde mixture. No additional acid catalyst is necessary in this instance.

*Example 10*

100 g. of a granular clay is impregnated with 10 g. of the nematocide, Nemagon (Shell). The product is then saturated with a resin-forming mixture of the following composition:

2 parts 40% aqueous formaldehyde
1 part urea
0.2 part thiourea
0.2 part 85% phosphoric acid Active mixing is carried on until resinification is complete. The resin constitutes about 80% of the finished product. The resin-treated material is found to decompose in the soil at a rate that effects gradual release of the nematocide in proportions and concentrations well tolerated by most plants without any phytoxicity, yet is outstanding in nematode destruction.

*Example 11*

1000 g. of peat are impregnated with 20.0 g. of Nemagon, and then treated as described in Example 1 and with the same resin-forming components. The finished product contains 91% resin.

While this invention has been disclosed with respect to certain varying modifications and preferred embodiments, other variations, modifications, and embodiments thereof will be obvious and apparent to those persons skilled in the art. It is to be understood that such variations, modifications, and embodiments are to be included within the spirit and purview of this application and the scope of the appended claims.

I claim:
1. A dry particulate pesticidal composition comprising particles of inert carrier impregnated with an organic pesticide, said particles being coated with an amido-aldehyde resin acid-condensed and polymerized in situ.
2. A composition as defined in claim 1 wherein said resin is urea-formaldehyde.
3. A composition as defined in claim 1 containing about 0.1 to 20 parts of said carrier and 0.5 to 50 parts of said resin for each part of said pesticide.
4. A method of preparing a dry particulate pesticidal composition comprising impregnating particles of an inert carrier with an organic pesticide, treating the impregnated particles with amido-aldehyde resin-forming reactants, and condensing and polymerizing said reactants in the presence of an acid catalyst to form a resin coating on said impregnated particles.
5. A method as defined in claim 4 wherein said reactants are urea and formaldehyde.
6. A method as defined in claim 4 wherein said acid catalyst is selected from the group consisting of sulfuric and phosphoric acid.
7. A method as defined in claim 4 employing about

0.1 to 20 parts of said carrier and 0.5 to 50 parts of said resin-forming reactants for each part of said pesticide.

References Cited in the file of this patent

UNITED STATES PATENTS

| | | |
|---|---|---|
| 2,490,958 | Graenacher | Dec. 13, 1949 |
| 2,535,475 | Anderson | Dec. 26, 1950 |
| 2,536,983 | Owen | Jan. 2, 1951 |
| 2,637,661 | Benignus | May 5, 1953 |
| 2,645,627 | Gustus | July 14, 1953 |
| 2,955,930 | Kealy | Oct. 11, 1960 |

FOREIGN PATENTS

| | | |
|---|---|---|
| 709,721 | Great Britain | June 2, 1954 |

OTHER REFERENCES

Handbook of Insecticide Dust Diluents and Carriers, 2nd Ed., 1955, Dorland Books, page 86.

King: Chemicals Evaluated as Insecticides, USDA Handbook No. 69, 1954, page 227.